United States Patent [19]

Asakura

[11] 3,988,497

[45] Oct. 26, 1976

[54] PHOTOCATHODE MADE OF A SEMICONDUCTOR SINGLE CRYSTAL

[75] Inventor: Norio Asakura, Hamamatsu, Japan

[73] Assignee: Hamamatsu Terebi Kabushiki Kaisha, Japan

[22] Filed: Oct. 21, 1974

[21] Appl. No.: 516,474

[30] Foreign Application Priority Data

Oct. 25, 1973 Japan ............................ 48-119448

[52] U.S. Cl. .................................. 428/409; 156/17; 313/366; 313/367; 357/30; 428/913

[51] Int. Cl.² ....................... B32B 3/10; H01J 39/00; H01J 31/38

[58] Field of Search .............. 161/164, 410; 156/17; 313/366, 367; 357/30; 428/409, 913

[56] References Cited

UNITED STATES PATENTS

| | | | |
|---|---|---|---|
| 3,487,223 | 12/1969 | St. John | 357/30 |
| 3,523,842 | 8/1970 | Glendinning | 156/17 |
| 3,590,344 | 6/1971 | Roberts | 357/30 |
| 3,677,833 | 7/1972 | Le Coq | 313/366 |
| 3,739,217 | 6/1973 | Bergh | 357/52 |
| 3,773,578 | 11/1973 | Glendinning | 156/17 |
| 3,791,948 | 2/1974 | Dixon | 156/17 |

FOREIGN PATENTS OR APPLICATIONS

| | | | |
|---|---|---|---|
| 945,933 | 1/1964 | United Kingdom | 156/17 |

OTHER PUBLICATIONS

J. W. Faust, Jr., "Etching of the III–V Intermetallic Compounds," *Compound Semiconductors*, vol. 1, pp. 445–468, Rheinhold, 1963.

*Primary Examiner*—Harold Ansher
*Assistant Examiner*—Ellis P. Robinson
*Attorney, Agent, or Firm*—Robert E. Burns; Emmanuel J. Lobato; Bruce L. Adams

[57] ABSTRACT

The photoelectric surface of a photocathode made of a semiconductor single crystal is made minutely rough and, accordingly, lusterless, so that the transmissivity of a polarized light beam incident on the photoelectric surface is almost unaffected by the direction of electric field vector of the beam.

2 Claims, 2 Drawing Figures

PHOTOCATHODE MADE OF A SEMICONDUCTOR SINGLE CRYSTAL

BACKGROUND OF THE INVENTION

This invention relates to photocathodes made of semiconductor single crystals, and more particularly to the photoelectric surface of the photocathode.

A photocathode made of a single crystal of a semiconductor such as gallium arsenide has very high sensitivity. In a conventional method of manufacturing a photoelectric cathode of this type, its photoelectric surface is mechanically abraded and uneven or rough parts of the photoelectric surface thus treated are removed, or smoothed, by a chemical etching method, so that the photoelectric surface is smooth like a mirror.

In the case where a light beam is detected by means of a photoelectric tube or a photomultiplier, the light beam is ordinarily applied to it through an optical system comprising a spectroscope, a reflective mirror, etc. In this case, the incident light beam is often polarized because it is reflected and refracted by the optical system. When this polarized light beam is applied to the mirror-like photoelectric surface of the conventional photocathode described above, its apparent sensitivity depends on the angle formed by the incident surface with the electric field vector of the polarized light beam. Accordingly, even if the intensity of the incident beam is kept unchanged, the photoelectric output of the photocathode depends on the conditions of arrangement of the optical system, which causes errors in the measurement of the light beam.

SUMMARY OF THE INVENTION

Accordingly, it is an object of this invention to provide a photocathode made of a semiconductor single crystal in which the above-described difficulties accompanying a conventional photocathode are overcome.

More specifically, an object of the invention is to provide a photocathode made of a semiconductor single crystal in which the influence of polarization of a light beam on an apparent sensitivity thereof is minimized.

The nature, utility and principle of this invention will be more clearly understood from the following detailed description and the appended claims when read in conjunction with the accompanying drawings.

DETAILED DESCRIPTION OF THE INVENTION

Figure 1:
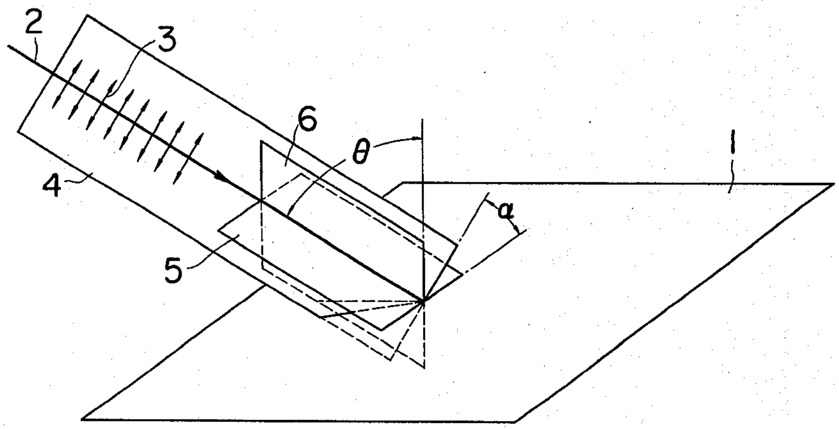
FIG. 1 is a perspective diagram for a description of the principle of this invention.

In this invention, a photoelectric or photoemissive surface of a photocathode made of a single crystal of a semiconductor such as, for instance, gallium arsenide is lusterless unlike that of the conventional photocathode. That is, the photoelectric surface of the photocathode according to this invention has a minutely rough surface.

One example of a method of making the photoelectric surface minutely rough according to this invention will be described. First, a (111)B surface of a single crystal of gallium arsenide is subjected to lapping with lapping powder such as carborundum thereby to impart thereto a rough surface. The single crystal thus treated is washed with distilled water after it has been degreased by immersion in an organic solvent such as trichloroethylene and is then immersed in a specific etching liquid. This etching liquid is obtained by mixing 5% solution of sodium hydroxide and a 30% solution of hydrogen peroxide in a volumetric ratio of 5 to 1, for instance. The etching liquid thus prepared has low activity.

The (111)B surface of the single crystal which has been roughly finished by lapping is dissolved by the etching liquid having low activity. As a result, uneven parts of the surface which have been caused by the lapping are removed to the extent that an etching pattern peculiar to the (111)B surface which is minutely uneven with a roughness of the order of $1\mu$ or less is obtained. At a suitable time instant, a quantity of water is applied to the crystal to stop the etching of the (111)B surface, and thereafter the crystal is dried. The crystal thus dried is built into a photoelectric tube or a photomultiplier and is activated with cesium or with cesium and oxygen to obtain a photocathode whose photoelectric surface is lusterless and highly sensitive.

If lapping and etching are applied to different surfaces of the single crystal in the same manner as described above, different etching patterns respectively peculiar to these different surfaces will appear.

The principle of this invention will now be described. If it is assumed that, as is indicated in FIG. 1, a linearly polarized light beam 2 is incident with an incidence angle $\theta$ to a conventional mirror-like photoelectric surface 1, and a plane 4 including the electric field vector of the polarized light beam forms an angle $\alpha$ with the photoelectric surface 1 for simplification in description, the transmissivity T of the beam 2 which passes through the photoelectric surface into the crystal can be represented by the following Equation (1):

$$T = T_p \cos^2\alpha + T_s \sin^2\alpha \qquad (1)$$

in which $T_p$ is the transmissivity where the electric field vector is parallel with the photoelectric surface 1 and is included in a plane 5 in FIG. 1; while $T_s$ is the transmissivity where the electric field vector is included in a plane 6 which is perpendicular to the photoelectric surface 1.

These transmissivities are determined from the incidence angle $\theta$ and the refractive angle of the crystal. In general, the transmissivity $T_p$ is much greater than $T_s$. Accordingly, the value of the transmissivity T changes greatly with the direction of the polarized light beam, that is, the value of the angle $\alpha$. That is, the quantity of a light beam which passes into the crystal to effectively excite the photons therein, depends on the direction of the polarized light beam and affects the sensitivity of the photocathode greatly.

Figure 2:
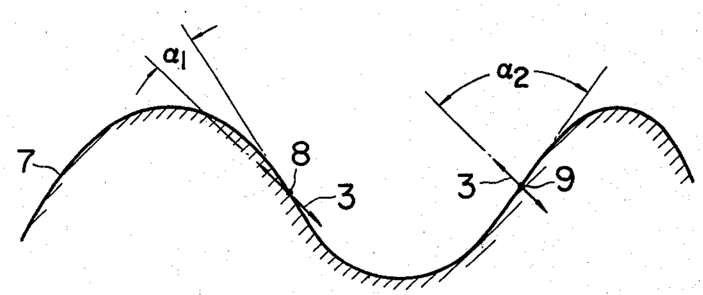
FIG. 2 is an enlarged sectional view of a part of the photoelectric surface of a photocathode according to the invention.

On the other hand, the photoelectric surface of the photocathode according to this invention is minutely rough as is shown by a waveform 7 in FIG. 2. Therefore, if it is assumed tha a polarized light beam incident on the photoelectric surface has an electric field vector 3 as shown in FIG. 2; then when the beam is incident at a point 8 on the photoelectric surface 7, the angle $\alpha_1$ formed by the direction of the vector 3 with the incidence surface is very small, and on the other hand, when the beam is incident at a point 9, the angle $\alpha_2$ formed by the vector 3 with the incidence surface is very large.

Thus, in the photocathode according to this invention, the angle $\alpha$ of Equation (1) has a number of values in a wide range of from a very small value to a very large value. Therefore, the total transmissivity T is almost unaffected by the direction of electric field vector of the polarized light beam, which leads to a great reduction of differences in sensitivity which are caused by differences in direction of the polarized light beam.

A result of a comparison between a conventional photocathode and photocathode of this invention is as follows.

In an experiment on the conventional photocathode, a linearly polarized light beam was incident with an angle of 48° to the mirror-like photoelectric surface of the photocathode made of a single crystal of gallium arsenide. In this experiment, the direction of the electric field vector was turned about the optical axis. When, in this operation, the difference between the maximum and minimum photoelectric outputs was represented by symbol $\Delta S$, and the average value of these two outputs was represented by symbol S, the value of $\Delta S/S$ was 0.44.

On the other hand, when three photocathodes according to this invention were tested in the same manner as in the case of the conventional photocathode, the values of $\Delta S/S$ were 0.10, 0.12, and 0.09, respectively, and the values of S were substantially equal to one another. Thus, according to the invention, the influence of a polarized light beam on the apparent sensitivity of a photocathode made of a single crystal of semiconductor can be minimized.

What is claimed is:

1. In a photocathode comprised of a single crystal of semiconductor and having an activated photoemissive surface for receiving in use light incident thereon to effect photoemission of electrons from the photoemissive surface; the improvement which comprises: means for rendering the sensitivity of said photoemissive surface to the light incident thereon substantially independent of polarization of the incident light and changes in the orientation of the polarized incident light relative to said photosensitive surface, said means comprising a rough surface portion of said photoemissive surface for receiving the light incident thereon and sufficiently rough so that the angle between the electric field vectors of the incident light and the rough portion of said photoemissive surface varies sufficiently between different points on the rough portion to render the sensitivity of said photocathode substantially independent of polarization of the incident light and changes in the orientation of the polarized incident light relative to the rough portion of said photoemissive surface.

2. In a photocathode as claimed in claim 1, in which the rough portion of said photoemissive surface is no more than 1 micron in height.

* * * * *